(12) United States Patent
Wingett

(10) Patent No.: US 7,679,010 B2
(45) Date of Patent: Mar. 16, 2010

(54) ROTATOR WHEEL

(75) Inventor: Gary Wingett, Southampton (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/583,392

(22) PCT Filed: Dec. 16, 2004

(86) PCT No.: PCT/IB2004/004356

§ 371 (c)(1),
(2), (4) Date: Jun. 19, 2006

(87) PCT Pub. No.: WO2005/062584

PCT Pub. Date: Jul. 7, 2005

(65) Prior Publication Data

US 2007/0102266 A1  May 10, 2007

(30) Foreign Application Priority Data

Dec. 19, 2003 (GB) .................................. 0329493.1

(51) Int. Cl.
*H01H 13/70* (2006.01)
(52) U.S. Cl. ........................ 200/5 A; 200/512
(58) Field of Classification Search .............. 200/4, 200/5 A, 5 R, 6 A, 6 R, 17 R, 512–517, 600
See application file for complete search history.

(56) References Cited

U.S. PATENT DOCUMENTS

| | | | | |
|---|---|---|---|---|
| 4,246,452 A * | 1/1981 | Chandler | ................... | 200/5 A |
| 4,566,001 A | 1/1986 | Moore | | |
| 5,744,765 A * | 4/1998 | Yamamoto | ................... | 200/6 A |
| 6,246,019 B1 * | 6/2001 | Nakamura et al. | .......... | 200/6 A |
| 6,313,731 B1 * | 11/2001 | Vance | .......... | 200/5 A |
| 6,441,753 B1 | 8/2002 | Montgomery | | |
| 6,586,689 B2 * | 7/2003 | Kuriyama | ................... | 200/6 A |
| 6,670,562 B2 * | 12/2003 | Kaneko | ................... | 200/1 B |
| 6,713,692 B2 * | 3/2004 | Yamasaki | ................... | 200/6 A |
| 6,750,408 B2 * | 6/2004 | Inoue et al. | ................. | 200/6 A |
| 6,979,785 B2 * | 12/2005 | Yamasaki | ................... | 200/6 A |
| 2002/0190727 A1 | 12/2002 | Morimoto | | |
| 2003/0018397 A1 | 1/2003 | Chanu | | |

FOREIGN PATENT DOCUMENTS

| | | |
|---|---|---|
| GB | 2 054 268 A | 2/1981 |
| GB | 2054268 A * | 2/1981 |
| WO | WO00/34965 A2 | 6/2000 |

* cited by examiner

*Primary Examiner*—Renee S Luebke
*Assistant Examiner*—Marina Fishman
(74) *Attorney, Agent, or Firm*—Alston & Bird LLP

(57) ABSTRACT

An input apparatus for a multimedia device, said input apparatus comprising: a rotator wheel having an upper planar surface that is substantially annular in shape and exposed in order that the upper planar surface may be accessed by a user of the multimedia device; means for detecting rotational movement of the rotator wheel about an axis perpendicular to the upper planar surface of the rotator wheel; and select means activated when a pressure is applied to the upper surface of the rotator wheel in a direction substantially parallel to an axis perpendicular to the upper planar surface of the rotator wheel.

17 Claims, 5 Drawing Sheets

ROTATOR WHEEL

FIELD OF THE INVENTION

The present invention relates to the field of user interfaces for multimedia devices, and in particular a rotator wheel for a mobile telephone.

BACKGROUND OF THE INVENTION

Multimedia devices commonly use a plurality of dome switches that interact cooperatively with keys on the multimedia device. When a key is depressed by the user, the dome switch is activated so as to provide an electrical signal to the circuitry of the multimedia device.

FIG. 1 of the attached drawings shows an exemplary multimedia device 1 comprising a screen 2, a keypad 3, a navigator key 4 and additional keys 5. The navigator key 4 and the additional keys 5 allow the user to interact with a user interface displayed on the screen 2. The navigator key 4 and the additional keys 5 typically operate so as to interact with dome switches mounted on a printed wiring board.

FIGS. 2A and 2B show a cross section of a typical dome switch in a non-actuated and actuated state respectively. The typical dome switch comprises a dome sheet 7 having at least one conductive pad 8 on the concave surface of the typical dome switch. The typical dome switch further comprises a board 6 having a plurality of tracks thereon for passing electrical signals between the dome switch and other circuitry, said tracks connected to conductive contact pads 9. The typical dome switch is arranged such that upon actuation of said dome the at least one conductive pad 8 is brought into contact with conductive contact pads 9 so as to complete an electric circuit between said conductive contact pads 9.

The typical dome switch described above may be considered as a conductive dome switch whereby upon actuation of the switch the conductivity between conductive contact pads 9 is changed. However, such a dome switch may also be implemented wherein the capacitance between said conductive contact pads 9 is altered upon actuation of said dome switch The navigator key 4 may be a 4-way switch. In this case the navigator key 4 interacts with four dome switches 12 mounted on dome sheet 11, shown in FIG. 3A. The position of the navigator key 4 is shown by outline 13 in this diagram. The navigator key 4 is arranged to pivot on a central point 14 equidistant from the four dome switches such that the user may tip the navigator key 4 so as to depress one of the dome switches 12 in order to interact with the multimedia device 1.

Dome switches or domes are designed with particular characteristics and qualities determined by the application for which they are required. Examples of these qualities are: force required for depression of the switch; amount of travel required by an activating member in order to depress the switch; the tactility of the switch; and the durability of the switch. The force, travel, and tactility of the switch all contribute to provide the user with feedback. The feedback may take the form of a clicking response at the key, and may even be accompanied by an audible click. It is important the user receives feedback upon depressing a key so as to increase the users satisfaction with the device. It is also important in the case that the information displayed on the screen 2 is not immediately updated after a key press in order to discourage the user from repeatedly pressing the key.

The navigator key 4 may alternatively have a 5-way operation. FIG. 3B shows the dome layout required for 5-way operation of the navigator key 4. Here, the navigator key interacts with 5 domes 12a, 12b, 12c, 12d and 15. Four of the domes 12a to d are arranged as discussed in relation to FIG. 2.

A central dome 15 is provided in the middle of the other four domes and is operated when the user applies pressure to a central portion of the navigator key 4. Activation of the central dome 15 may be interpreted by the multimedia device as a confirmatory response from the user such as "select" or "ok".

The above described navigator keys have limited functionality, requiring a complicated and unintuitive user interface. This can cause the multimedia device to be difficult to use and make the accessing of particular functions of the device cumbersome for the user. This problem is becoming more pertinent to multimedia devices as these devices increase in complexity and have an increasing number of available functions.

It is an aim of embodiments of the present invention to solve or at least mitigate one or more of the problems described above.

It is another aim of the present invention to provide an improved user interface for a multimedia device that is advantageously more intuitive for the user.

SUMMARY OF THE INVENTION

According to a first aspect of the present invention, there is provided a dome switch having a shape extending at least substantially along a length of an annular shaped path.

According to a second aspect of the present invention, there is provided an input apparatus for a multimedia device, said input apparatus comprising:

a rotator wheel having an upper planar surface that is substantially annular in shape and exposed in order that the upper planar surface may be accessed by a user of the multimedia device;

means for detecting rotational movement of the rotator wheel about an axis perpendicular to the upper planar surface of the rotator wheel; and select means activated when a pressure is applied to the upper surface of the rotator wheel in a direction substantially parallel to an axis perpendicular to the upper planar surface of the rotator wheel.

BRIEF DESCRIPTION OF THE DRAWINGS

Embodiments of the present invention will now be described with reference to the accompanying drawings briefly described below.

DETAILED DESCRIPTION OF PREFERED EMBODIMENTS OF THE PRESENT INVENTION

Figure 1:
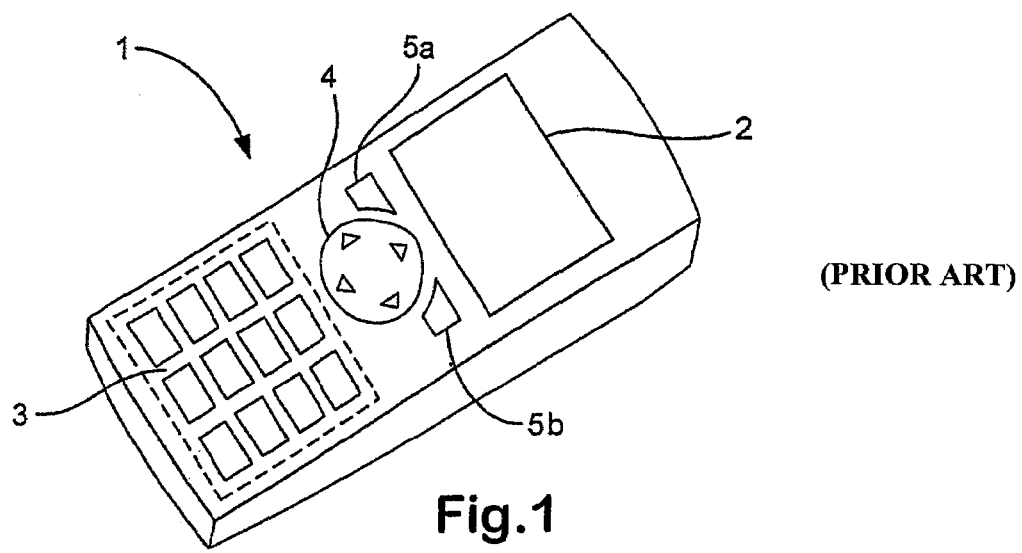
FIG. 1 shows an example of a multimedia device.
Figure 2A:
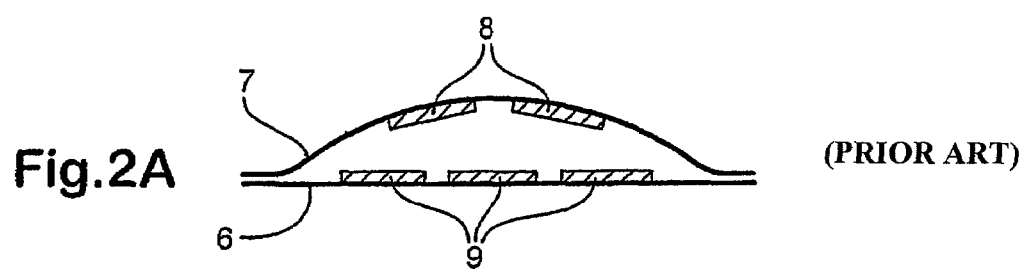
FIGS. 2A and 2B show a cross section of a typical dome switch in a non-actuated and actuated state respectively.
Figure 2B:
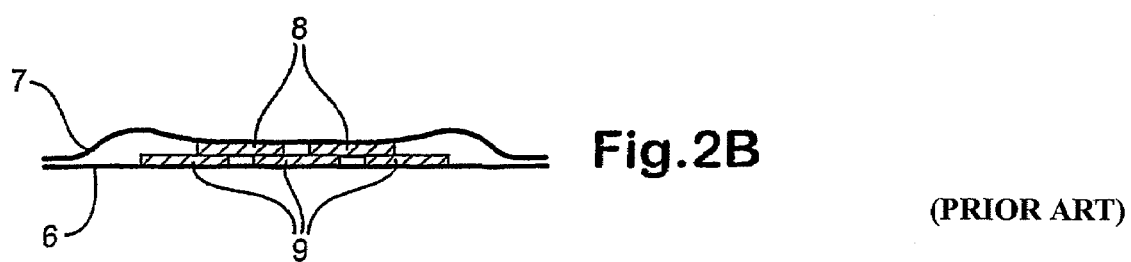
Figure 3A:
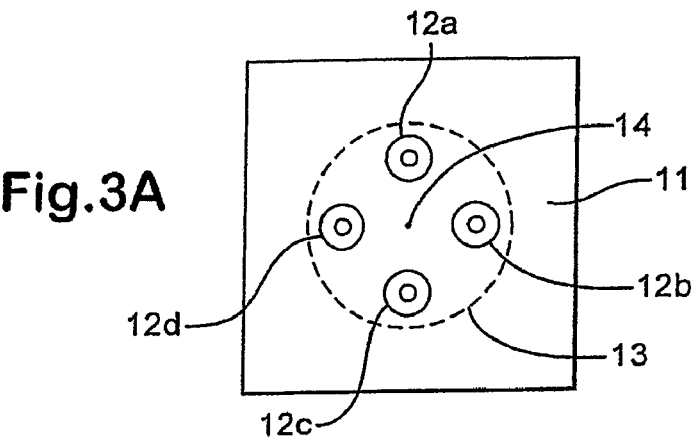
FIG. 3A shows a dome sheet for a 4-way navigator key.
Figure 3B:
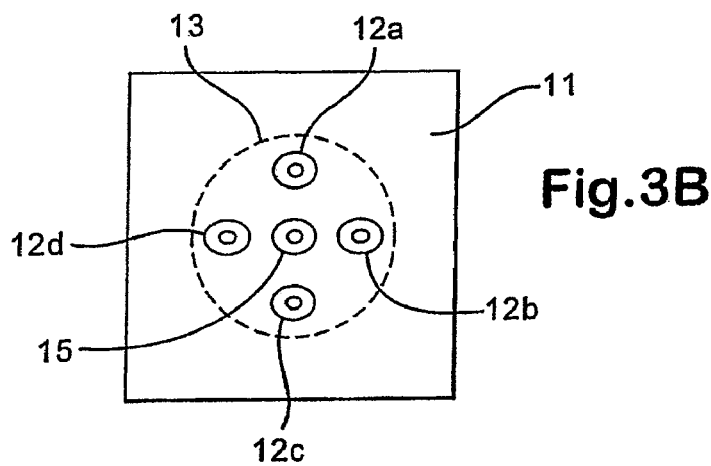
FIG. 3B shows a dome sheet for a 5-way navigator key.
Figure 4:
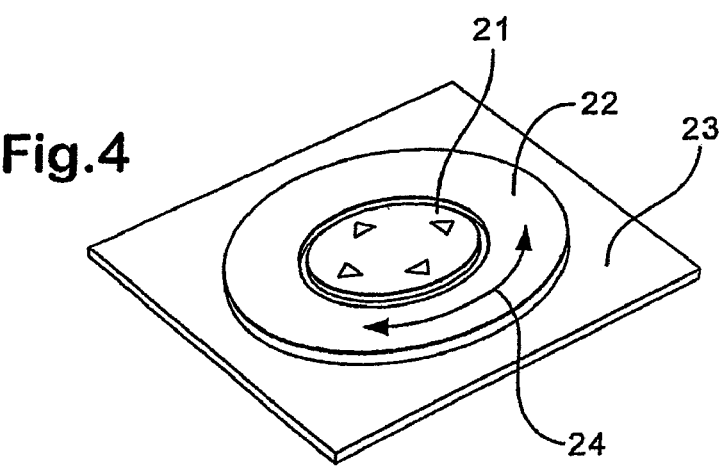
FIG. 4 shows a preferred embodiment of the present invention having a central navigator key and a rotator wheel.

FIG. 4 shows a navigator key 21 and a rotator wheel 22 mounted on a dome sheet 23 in accordance with a preferred embodiment of the present invention. The navigator key 21 and rotator wheel 22 replace the navigator key 4 of the multimedia device 1 shown in FIG. 1. The navigator key 21 may be a 4-way or 5-way navigator key.

The function of the rotator wheel 22 will now be described. The rotator wheel 22 may rotate in either a clockwise or an anticlockwise direction about its centre on an axis perpendicular to the plane of the dome sheet 23. The direction of rotation of the rotator wheel 22 is shown by arrow 24, this arrow is not an essential feature of the present invention. The rotator wheel 22 is mounted on a lower track section that does not rotate. The lower track section comprises a means for facilitating the monitoring of the rotational position of the upper wheel by the multimedia device 1, in order that a user may interact with the multimedia device by rotating the rotator wheel 22.

The monitoring means may comprise two concentric substantially annular conductive tracks, and a bridge contact arranged to rotate in conjunction with the rotator wheel 22. The bridge contact may slide along both of the concentric substantially annular conductive tracks, and provide an electrical contact between the two concentric substantially annular conductive tracks. The two concentric substantially annular conductive tracks both contain a relatively small non-conductive sector. Circuitry of the multimedia device 1 may thus apply pulses to one of the two concentric substantially annular conductive tracks and monitor the amount of time required for the pulse to return along the other concentric substantially annular conductive track. The length of time the pulse takes to return gives an indication of the position of the conducting bridge and hence the position of the rotator wheel 22. Thus, by monitoring the position of the rotator wheel over time, the circuitry of the multimedia device may measure the motion of the rotator wheel.

Alternatively, the monitoring means may comprise a plurality of radial segments, and a bridge contact arranged to rotate in conjunction with the rotator wheel 22. The bridge contact may slide along the radial segments, and provide an electrical contact between at least two adjacent radial segments. Circuitry of the multimedia device 1 may thus monitor which of the radial segments are connected and thus ascertain a position of the rotator wheel 22. As above, by monitoring the position of the rotator wheel over time, the circuitry of the multimedia device may measure the motion of the rotator wheel.

It is an aim of embodiments of the present invention to provide a multimedia device having a rotator wheel 22 with a select function. A user may activate the select function by applying pressure to an upper surface of the rotator wheel 22 at any point around the rotator wheel 22. The upper surface of the rotator wheel 22 is a surface of the rotator wheel 22 most distal from the dome sheet 23. The pressure required to activate the select function of the rotator wheel 22 is of a sufficient level such that a user may apply a force to the upper surface of the rotator wheel 22 in order to grip the upper surface of the rotator wheel 22 such that a component of the force applied by the user is in a direction of rotation of the rotator wheel 22, the component of the force being sufficient to cause the rotator wheel 22 to rotate in said direction, wherein the force applied by the user is not sufficient to activate the select function of the rotator wheel.

Figure 5:
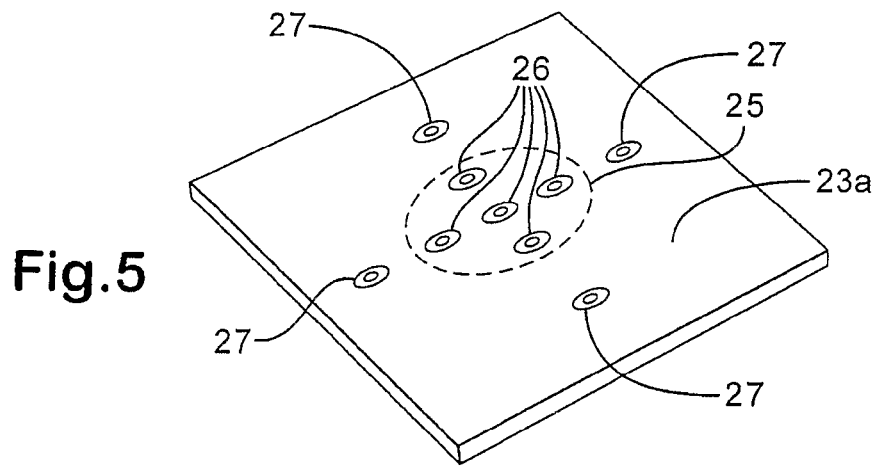
FIG. 5 shows one possible structure for the dome sheet required for the apparatus of FIG. 4.

A possible structure of the dome sheet 23 is shown in FIG. 5. A dome sheet 23a contains 4 or 5 dome switches 26 for detecting movement of the 4-way or 5-way navigator key 21. The position of the 4-way or Sway navigator key 21 is shown by outline 25. Dome sheet 23a additionally comprises 4 domes 27 on which the rotator wheel and detection means are mounted.

The rotator wheel 22 mounted on a dome sheet 23a having the structure shown in FIG. 5 provides adequate feedback to the user when the user depresses the rotator wheel 22 in an area above one of the four domes 27. In the apparatus of FIG. 5, adjacent domes are separated by 90 degrees. If the user were to apply pressure to the rotator wheel 22 in an area between a pair of adjacent domes 27, then both of the pair of adjacent domes 27 will be depressed. This can lead to dual clicking, wherein the two domes click at slightly different times. Dual clicking can be disconcerting for the user, and reduce user satisfaction with the device. Dual clicking can further cause the multimedia device to respond in an unpredictable manor.

Figure 6A:
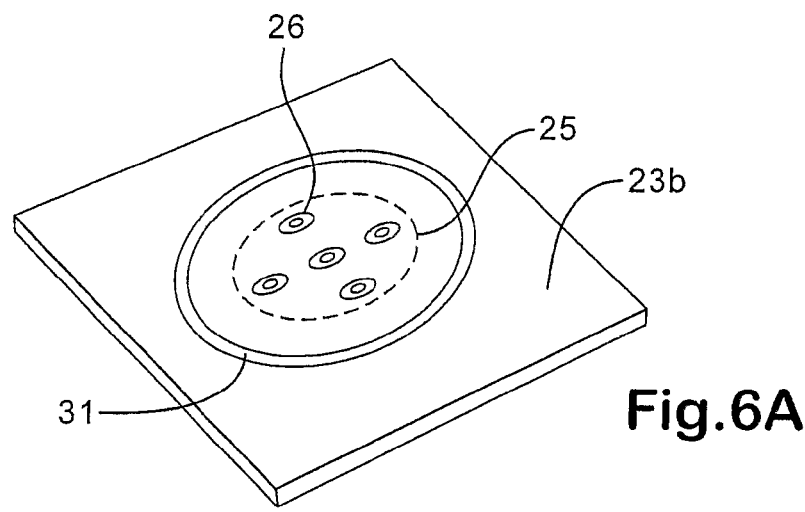
FIG. 6A shows a second possible structure for the dome sheet required for the apparatus of FIG. 4.

A preferred embodiment of the present invention is shown in FIG. 6A. Dome sheet 23a of FIG. 5 is replaced by dome sheet 23b of FIG. 6A. Dome sheet 23b comprises a singular annular dome 31 in place of the four domes 27 of dome sheet 23a. Annular dome 31 provides consistent feedback to the user irrespective of the area of the exposed surface of the rotator wheel 22 to which the user applies pressure in order to activate a select function of the rotator wheel.

Figure 6B:
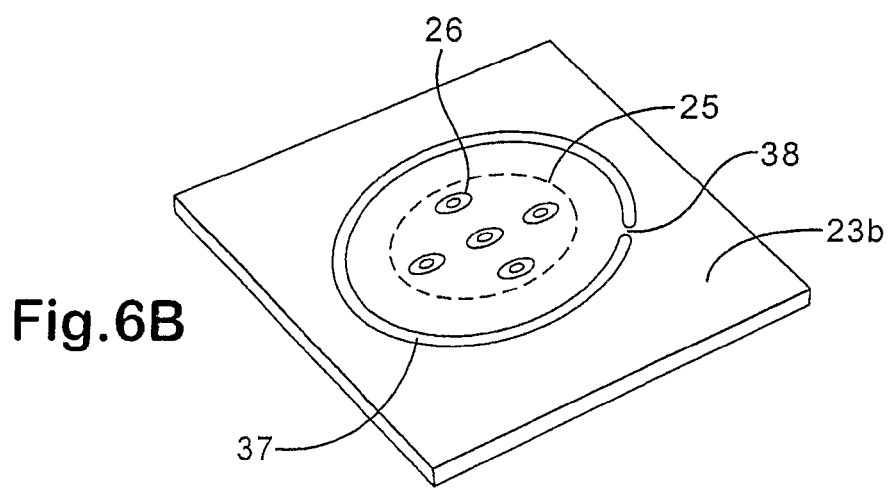
FIG. 6B shows a third structure for the dome sheet required for the apparatus of FIG. 4.

An alternative to the apparatus of FIG. 6A is shown in FIG. 6B, wherein the annular dome 31 is replaced by a partial annular dome 37 comprising a sector of an annulus. The remaining sector of the annulus comprises a gap 38.

The gap 38 may be of a sufficiently small size so as to cause at least one portion of the annular dome 37 to be actuated upon the application of an actuating force to a switching member over the gap 38.

Figure 7A:
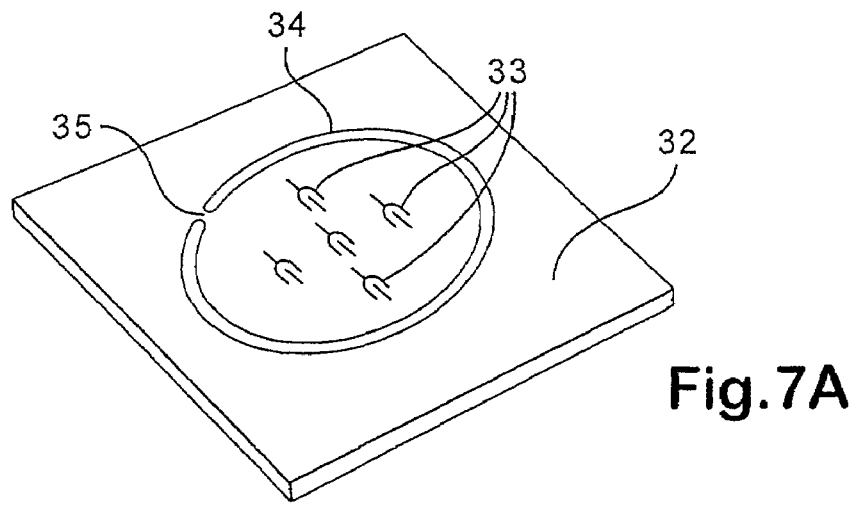
FIGS. 7A and 7B show two possible connection pad designs for a printed wiring board for use with the dome sheets of FIG. 6.

A possible connection pad design for use with the dome sheet of FIG. 6A is shown in FIG. 7A. 5 Connection pads 33 are shown which interface with the 5 dome switches 26 on the dome sheet 23b of FIG. 6. The connection pad design also includes a continuous band 34 for interfacing with the annular dome 31 of FIG. 6A. The continuous band 34 comprises two substantially annular concentric band portions having a gap 35 wherein the same angular section of each band is omitted. It is envisages that the angle subtended by the gap is small in comparison to the angle subtended by the remaining concentric band portions. On one side of the gap 35, the two concentric continuous band portions are connected by an electrically conductive radial element. On the opposing side of the gap, each concentric continuous band portion is connected to detection circuitry. That is, each end of the continuous band portion 34 is connected to the detection circuitry.

Figure 9:
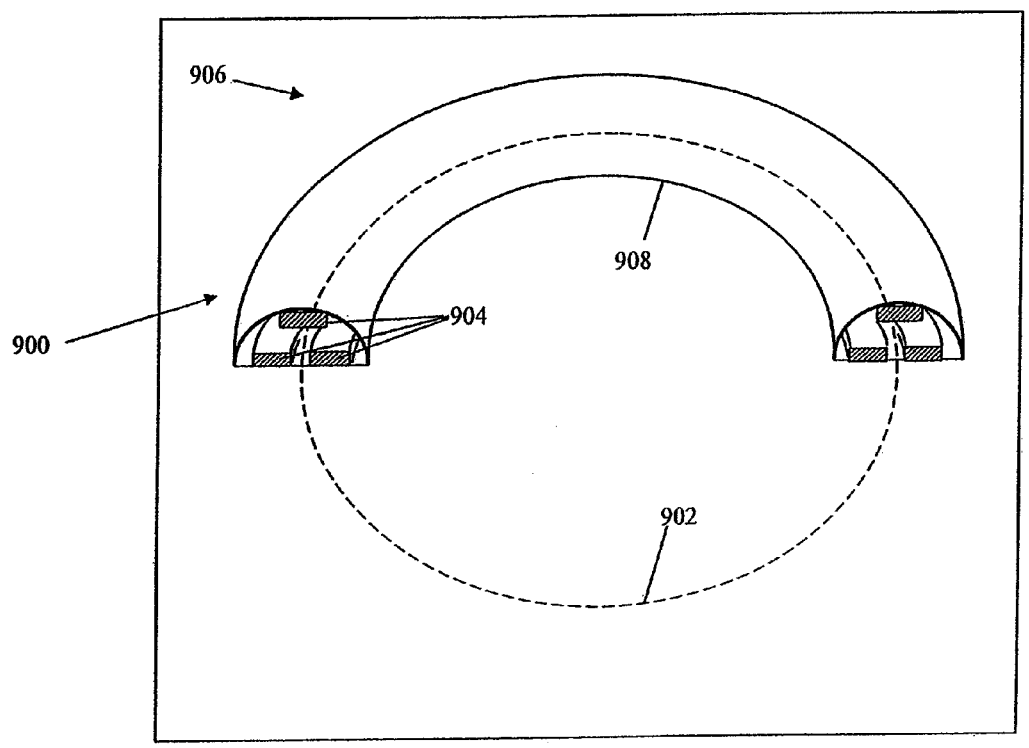
FIG. 9 shows a cross sectional view of an annular dome switch according to an exemplary embodiment of the invention

FIG. 9 shows a cross sectional view of the annular dome switch 900. The annular dome switch 900 extends along an annular shaped path 902. The annular dome switch 900 has an upper dome sheet 908 which extends from an underlying substrate 906. The underlying substrate 906 and the upper dome sheet 908 have conductive pads 904 arranged to be brought into contact and complete an electrical circuit.

The function of the apparatus shown in FIGS. 6A and 7A will now be described. When the annular dome 31 is depressed a contact is made between the two concentric continuous band portions of continuous band 34 by the dome at the point of application of force to the dome. The detection circuitry connected to each end of the continuous band portion 34 is adapted to generate electrical signals of a pulse form at one end of the continuous band 34, and detect the time taken for these electrical signals to return to the detection circuitry via the length of the continuous band, this may be called the propagation delay. It should be apparent to the reader that in depressing the annular dome and forming a contact between the two continuous band portions at a point other than on one side of the gap 35, the propagation delay will be reduced proportionate to the point along the circumference of the continuous band 34 at which the contact is made. In this manner, the detection circuitry may establish the point at which the annular dome is depressed by measuring the propagation delay of the signal through the continuous band 34.

Figure 7B:
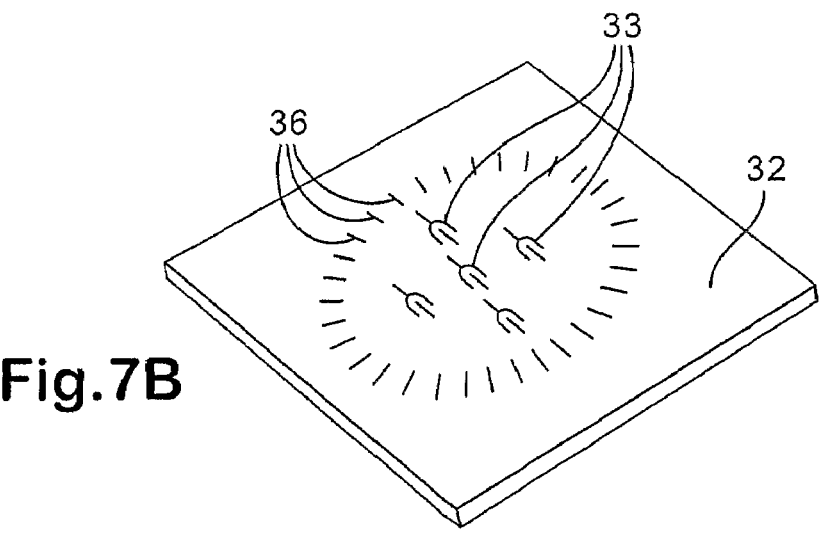

An alternative possible connection pad design for use with the dome sheet of FIG. 6 is shown in FIG. 7B. 5 Connection pads 33 are shown which interface with the 5 dome switches 26 on the dome sheet 23b of FIG. 6. The connection pad design also includes a plurality of radial contacts 36. The number of radial contacts 36 shown in FIG. 7B is purely illustrative. The radial contacts 36 are each connected to detection circuitry, and electrically insulated from each other.

In cross section, a segment of the annular dome may be generally part circular or part parabolic, extending from the underlying substrate, or may take another shape; for example its wall may be more steeply sloping on the interior of the annulus than on the exterior.

The function of the apparatus shown in FIGS. 6A and 7B will now be described. When the annular dome 31 is depressed a contact is made between the two radial contacts 36 by the dome at the point of application of force to the dome. The detection circuitry connected to each radial contact 36 is adapted to detect which, if any of the radial contacts 36 are connected by the annular dome 31. Thus, the detection circuitry may establish the point at which the annular dome is depressed by detecting which of the radial contacts 36 are electrically connected.

Figure 8:
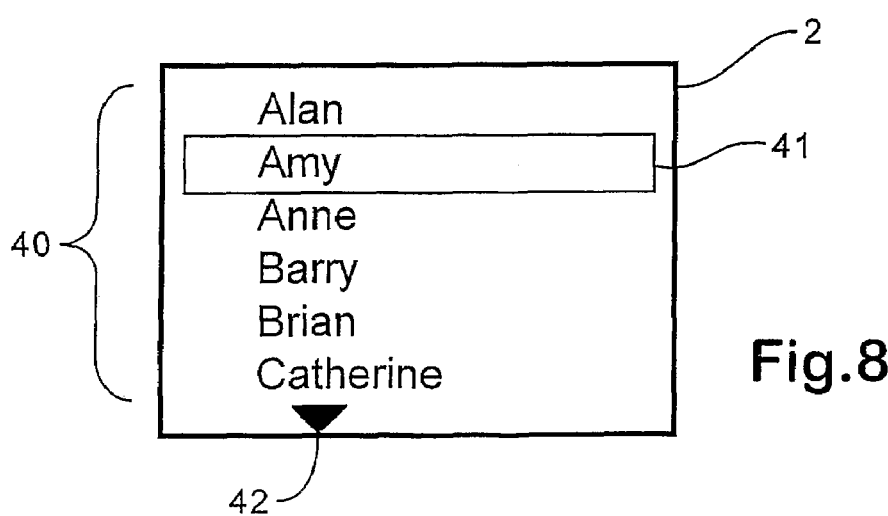
FIG. 8 shows an example of information displayed by a display means of a multimedia device.

The function of a multimedia device 1 incorporating the rotator wheel 22 described above will now be described with reference to FIG. 8, which shows an image that may be shown on the screen 2 of the multimedia device 1. By way of example, FIG. 8 shows a list of names 40, one of which a user of the multimedia device 1 may wish to select in order to perform some function, for example sending a message to a device associated with one of the users. The rotator wheel 22 may be used by the user to move a selection box or cursor 41 up or down the list of names 40. Arrow 42 indicates to the user that more names than those displayed are available for selection, these may be accessed by scrolling down past the last name in the list. The user may move the selection box 41 to highlight a particular name in the list of names 40. Once the particular name is highlighted, the user may depress the rotator wheel 22 to activate a selection means, which may be an annular dome switch, in order to instruct the multimedia device to perform some function with information stored in connection with the particular name.

The annular dome 31 is shown in FIG. 6A as being substantially circular in shape. However, it is envisaged that the annular dome 31 may be polygon of any number of sides. Further, it is envisaged that in the absence of a rotate wheel an annular dome of any shape, for example elliptical, may be advantageously employed so as to offer a user a readily accessible select function.

Embodiments of the present invention have been described in the context of a rotator wheel for use with a multimedia device. However, it should be appreciated that embodiments of the present invention can be used with any other type of electronic device requiring a user interface or user input apparatus.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An annular dome switch comprising:
   an upper dome sheet; and
   an underlying substrate;
   wherein the upper dome sheet extends from the underlying substrate defining a raised cross-sectional shape, the raised cross-sectional shape extending at least substantially along a length of an annular shaped path, wherein:
   the underlying substrate comprises two substantially continuous annular concentric connection pads, connection pads, the two substantially continuous annular concentric connection pads comprising an inner annular pad and an outer annular pad, each having opposite ends, one end of said inner annular pad being connected to one end of said outer annular pad by a radial element and opposing ends being connected to a detection circuitry; and
   the upper dome sheet is configured to make electrical contact with the connection pads of the underlying substrate when the upper dome sheet is depressed towards the underlying substrate such that the electrical contact completes an electrical circuit and that a length of the substantially continuous annular concentric connection pads in the electrical circuit is dependent on where the electrical contact is made.

2. The annular dome switch as claimed in claim 1, wherein said annular dome switch surrounds at least one other dome switch.

3. The annular dome switch as claimed in claim 1, wherein said annular dome switch comprises a partial annulus.

4. The annular dome switch as claimed in claim 1, wherein said annular dome switch comprises a complete annulus.

5. The annular dome switch as claimed in claim 1, wherein a select means is activated upon actuation of the annular dome switch.

6. The annular dome switch as claimed in claim 1, wherein a rotator wheel is mounted on said annular dome switch.

7. The annular dome switch as claimed in claim 6, wherein the annular dome switch is actuated when a pressure is applied to an upper surface of the rotator wheel in a direction substantially parallel to an axis perpendicular to the upper planar surface of the rotator wheel.

8. The annular dome switch as claimed in claim 6, wherein an upper planar surface of the rotator wheel is substantially annular in shape.

9. The annular dome switch as claimed in claim 6, wherein an upper planar surface of the rotator wheel is exposed such that the upper planar surface may be accessed by a user.

10. The annular dome switch as claimed in claim 6, wherein the rotator wheel is connected to monitoring means for detecting rotational movement of the rotator wheel about an axis perpendicular to an upper planar surface of the rotator wheel.

11. An input apparatus comprising an annular dome switch as claimed in claim 1.

12. The input apparatus as claimed in claim 11, wherein activation of the dome switch comprises temporarily modifying the electrically conductive or electrically capacitive properties of an electronic element.

13. An input apparatus for a multimedia device, said input apparatus comprising:
   a rotator wheel having an upper planar surface that is substantially annular in shape and exposed in order that the upper planar surface may be accessed by a user of the multimedia device;
   means for detecting rotational movement of the rotator wheel about an axis perpendicular to the upper planar surface of the rotator wheel; and
   select means activated when a pressure is applied to the upper surface of the rotator wheel in a direction substantially parallel to an axis perpendicular to the upper planar surface of the rotator wheel,
   wherein the select means is an annular dome switch, the annular dome switch comprising:
   an upper dome sheet; and
   an underlying substrate;
   wherein the upper dome sheet extends from the underlying substrate defining a raised cross-section shape, the raised cross-section shape extending at least substantially along a length of an annular shaped path, wherein:
   the underlying substrate comprises two substantially continuous annular concentric connection pads, connection pads, the two substantially continuous annular concentric connection pads comprising an inner annular pad and an outer annular pad, each having opposite ends, one end of said inner annular pad being connected to one end of said outer annular pad by a radial element and opposing ends being connected to a detection circuitry; and
   the upper dome sheet is configured to make electrical contact with the connection pads of the underlying substrate when the upper dome sheet is depressed towards the underlying substrate such that the electrical contact completes an electrical circuit and that a length of the substantially continuous annular concentric connection pads in the electrical circuit is dependent on where the electrical contact is made.

14. The input apparatus as claimed in claim 13, further comprising means to detect rotational movement of the rotator wheel.

15. The input apparatus as claimed in claim 14, wherein the means to detect rotational movement comprises conductive tracks.

16. The input apparatus as claimed in claim 13 in which a bridge contact is arranged to rotate in conjunction with the wheel.

17. The input apparatus as claimed in claim 13, wherein a tactile response of the select means is substantially the same over all of the rotator wheel.

* * * * *